(12) United States Patent
Choi et al.

(10) Patent No.: US 12,309,507 B2
(45) Date of Patent: May 20, 2025

(54) ELECTRONIC DEVICE AND METHOD FOR CONTROLLING SAME

(71) Applicant: SAMSUNG ELECTRONICS CO., LTD., Suwon-si (KR)

(72) Inventors: Hyunsoo Choi, Suwon-si (KR); Seungsoo Kang, Suwon-si (KR); Heeyoon Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 117 days.

(21) Appl. No.: 18/131,582

(22) Filed: Apr. 6, 2023

(65) Prior Publication Data

US 2023/0276140 A1   Aug. 31, 2023

Related U.S. Application Data

(63) Continuation of application No. PCT/KR2021/012513, filed on Sep. 14, 2021.

(30) Foreign Application Priority Data

Oct. 28, 2020  (KR) .................. 10-2020-0141202
Jan. 11, 2021  (KR) .................. 10-2021-0003533

(51) Int. Cl.
*H04N 23/45*  (2023.01)
*H04N 23/61*  (2023.01)
(Continued)

(52) U.S. Cl.
CPC ........... *H04N 23/951* (2023.01); *H04N 23/61* (2023.01); *H04N 23/90* (2023.01)

(58) Field of Classification Search
CPC ................ H04N 23/45; H04N 23/64
(Continued)

(56) References Cited

U.S. PATENT DOCUMENTS 10,553,116 B2   2/2020   Yi et al.
10,715,716 B2   7/2020   Lee et al.
(Continued)

FOREIGN PATENT DOCUMENTS

EP         3641294 A1    4/2020
KR  10-2019-0101115 A   8/2019
(Continued)

OTHER PUBLICATIONS

Extended European Search Report dated Jan. 22, 2024 in European Application No. 21886554.1.
(Continued)

*Primary Examiner* — Anthony J Daniels
(74) *Attorney, Agent, or Firm* — Sughrue Mion, PLLC

(57) ABSTRACT

An electronic device and a method for controlling same are disclosed. The electronic device includes a first camera having a first lens with a first focal distance, a second camera including a second lens having a second focal distance different from the first focal distance, a memory, and a processor which: acquires information on a first object included in a first image acquired by capturing surroundings of the electronic device through the first camera if it is identified, based on of the acquired information on the first object, that information on a second object associated with the first object exists, acquires a second image through the second camera and based on whether the second object is included in the acquired second image, determines a point of time when high-speed image capture is to be performed using the first camera.

20 Claims, 10 Drawing Sheets

(51) Int. Cl.
  *H04N 23/90*    (2023.01)
  *H04N 23/951*   (2023.01)
(58) Field of Classification Search
  USPC ........................................... 348/223.1
  See application file for complete search history.

(56)       References Cited

U.S. PATENT DOCUMENTS

| | | | |
|---|---|---|---|
| 10,785,387 | B2 | 9/2020 | Kim et al. |
| 11,102,409 | B2 | 8/2021 | An |
| 11,290,633 | B2 | 3/2022 | Lee et al. |
| 11,533,428 | B2 | 12/2022 | Sindhagatta Krishnappa et al. |
| 2015/0229889 | A1* | 8/2015 | Boettiger ............... H04N 23/71 348/262 |
| 2016/0248988 | A1* | 8/2016 | Urfalioglu ........... H04N 23/951 |
| 2018/0137119 | A1 | 5/2018 | Li et al. |
| 2019/0260914 | A1 | 8/2019 | Kim et al. |
| 2019/0281206 | A1 | 9/2019 | Lee et al. |
| 2020/0012868 | A1 | 1/2020 | Hong et al. |
| 2020/0077019 | A1 | 3/2020 | Kim et al. |
| 2020/0128181 | A1 | 4/2020 | An |
| 2020/0304704 | A1 | 9/2020 | Lee et al. |
| 2022/0224825 | A1 | 7/2022 | Lee et al. |
| 2022/0301351 | A1* | 9/2022 | Zhao ..................... G06T 7/215 |

FOREIGN PATENT DOCUMENTS

| | | |
|---|---|---|
| KR | 10-2019-0101706 A | 9/2019 |
| KR | 10-2019-0120489 A | 10/2019 |
| KR | 10-2053940 B1 | 12/2019 |
| KR | 10-2020-0043818 A | 4/2020 |
| KR | 10-2021-0095547 A | 8/2021 |

OTHER PUBLICATIONS

International Search Report (PCT/ISA/210) issued Dec. 16, 2021 by the International Searching Authority in counterpart International Patent Application No. PCT/KR2021/012513.

Written Opinion (PCT/ISA/237) issued Dec. 16, 2021 by the International Searching Authority in counterpart International Patent Application No. PCT/KR2021/012513.

* cited by examiner

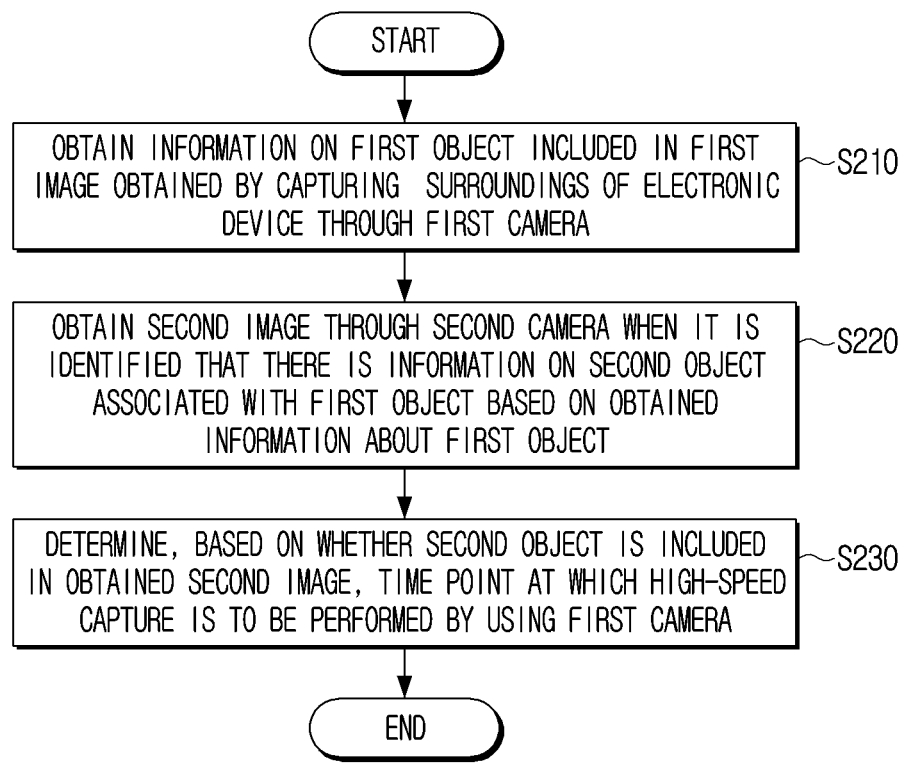

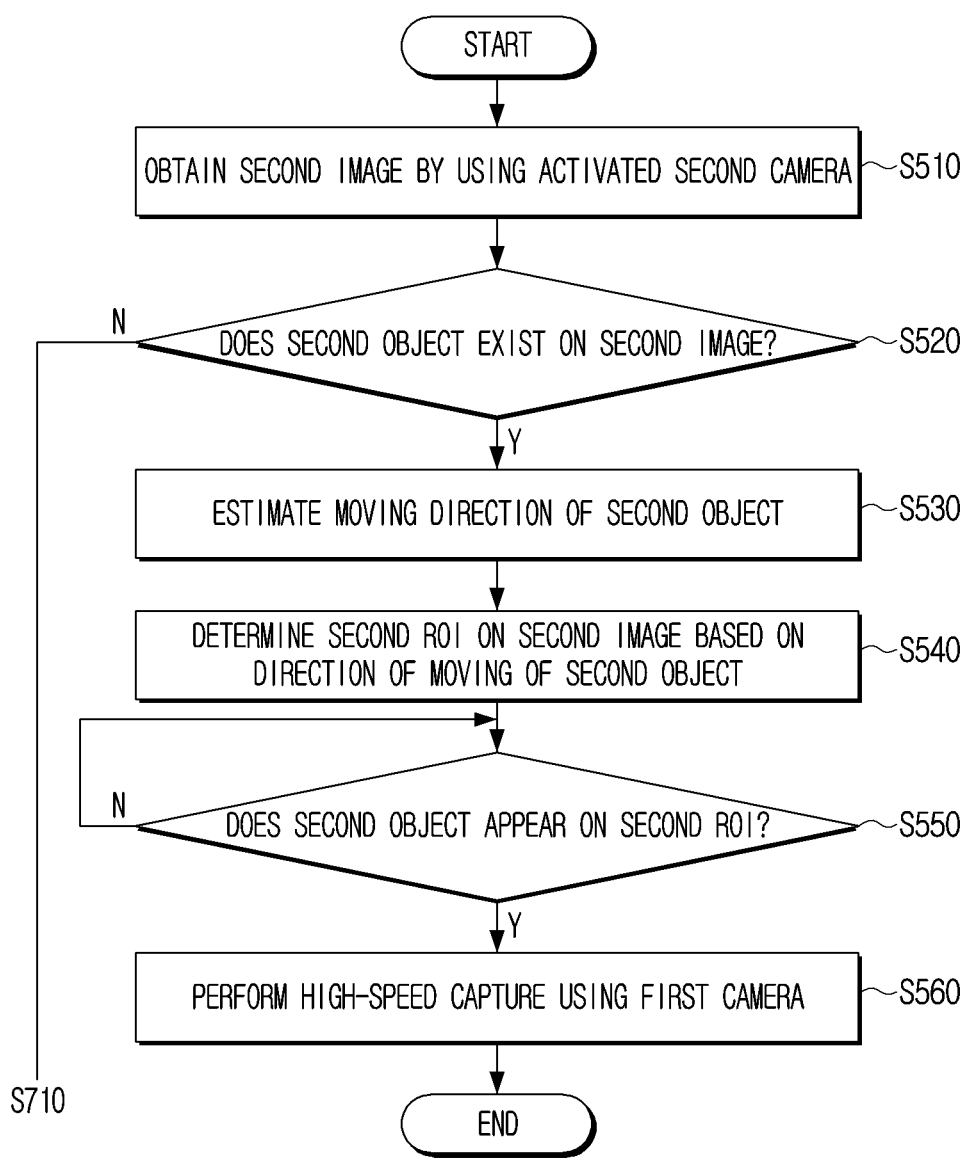

ELECTRONIC DEVICE AND METHOD FOR CONTROLLING SAME

CROSS-REFERENCE TO RELATED APPLICATION(S)

This application is a bypass continuation application of PCT Application No. PCT/KR2021/012513, filed on Sep. 14, 2021, which is based on and claims priority under 35 U.S.C. § 119(a) from Korean Patent Application No. 10-2021-0003533, filed on Jan. 11, 2021, and Korean Patent Application No. 10-2020-0141202, filed on Oct. 28, 2020, in the Korean Intellectual Property Office, the disclosures of which are incorporated by reference herein in their entirety.

BACKGROUND

1. Field

The disclosure relates to an electronic device and a method for controlling the electronic device, and more particularly to, an electronic device capable of determining a timing of performing a super slow motion (SSM) operation based on an object included in an image (or video) and a method for controlling the electronic device.

2. Description of Related Art

A super slow motion (SSM) image refers to an image captured in order to record a high-speed motion in a specific scene. Since a large amount of computing resources, storage resources, and power are consumed in order to generate an SSM image, it is preferable to generate an SSM image in a short time period in which a specific event occurs in one scene.

When the SSM image recording operation is manually activated, if an unexpected event occurs or an object included in the image moves quickly, the user is likely to perform an SSM image recording start operation earlier or late than an appropriate timing. Accordingly, a user may not record an SSM image for an intended event or may record an SSM image with very large capacity as an unintended scene is included.

SUMMARY

According to an aspect of the disclosure, there is provided an electronic device for determining a time point for performing an SSM operation based on an object included in an image obtained through at least one camera, and a method for controlling the electronic device.

According to an aspect of the disclosure, there is provided an electronic device including: a first camera including a first lens having a first focal distance, a second camera including a second lens having a second focal distance different from the first focal distance, a memory storing one or more instruction and a processor configured to execute the one or more instructions to: obtain first information corresponding to a first object included in a first image obtained by the first camera, identify second information corresponding to a second object associated with the first object based on the first information on the first object, obtain a second image through the second camera based on identifying the second information, and determine a time to perform high-speed capture using the first camera based on whether the second object is included in the second image.

The processor may be further configured to: determine a first region of interest (ROI) on the first image, and obtain the first information corresponding to the first object in the first ROI by applying the first information in the first ROI to a first model trained to perform object recognition.

The memory may further store knowledge base including information related to a plurality of objects, and the processor may be further configured to: identify whether the first object is a moving object based on the first information corresponding to the first object, based on identifying that the first object is a non-moving object, identify whether information about a type of a second object associated with a type of the first object exists in the knowledge base, and based on identifying that the information on the type of the second object exists in the knowledge base, obtain the second image by activating the second camera.

The knowledge base may include a plurality of nodes including types of the plurality of objects and an edge including direction relationship information about a direction relationship among the plurality of nodes, wherein the processor may be further configured to: identify a first node including a type of the first object among the plurality of objects in the knowledge base, and identify whether a second node connected to the identified first node exists based on the direction relationship information.

The processor may be further configured to: based on identifying that the second node connected to the first node exists in the knowledge base, obtain the second image by activating the second camera, and identify whether the second object exists in the second image based on the direction relationship information included in the edge connected between the first node and the second node.

The processor may be further configured to: based on identifying that the second object exists on the second image, estimate a moving direction of the second object, and determine a second ROI in the second image based on the estimated moving direction of the second object.

The processor may be further configured to: identify whether the second object is present in the determined second ROI, and determine a point of time when the second object is present in the second ROI as the time to perform the high-speed capture using the first camera.

The processor may be further configured to: based on identifying that the first object is a moving object using the information on the first object, estimate a moving direction of the first object, determine a third ROI in the first image based on the estimated moving direction of the first object, and determine a point of time when the first object appears on the third ROI as the time to perform high-speed capture using the first camera.

The processor may be further configured to: based on identifying that information on a type of the second object associated with a type of the first object does not exist in the knowledge base, monitor a state change of the first object in the first ROI, and determine a point of time that the state of the first object changes as the time to perform high-speed capture using the first camera.

The processor may be further configured to: based on identifying that the first object is not included in the first ROI based on the first information on the first ROI, obtain the second image by activating the second camera, identify a third object on a region in the second image, the region not overlapping the first image, and determine a point of time when the third object moves in a direction of the first image as the time to perform high-speed capture using the first camera.

According to another aspect of the disclosure, there is provided a method of controlling an electronic device including a first camera having a first lens with a first focal distance and a second camera having a second lens with a second focal distance different from the first focal distance, the method including: obtaining first information corresponding to a first object included in a first image obtained by the first camera; identifying second information corresponding to a second object associated with the first object based on the first information on the first object, obtaining a second image through the second camera based on identifying the second information; and determining a time to perform high-speed capture using the first camera, based on whether the second object is included in the second image.

According to another aspect of the disclosure, there is provided an electronic device including: a memory storing one or more instruction; and a processor configured to execute the one or more instructions to: obtain first information corresponding to a first object included in a first image, the first image including a plurality of first frames, identify second information corresponding to a second object associated with the first object based on the first information on the first object, obtain a second image based on identifying the second information, the second image including a plurality of second frames, and determine a time to perform high-speed capture based on whether the second object is included in the second image.

According to the various example embodiments described above, an electronic device may correctly and efficiently determine a timing of performing an SSM operation.

BRIEF DESCRIPTION OF THE DRAWINGS

FIG. 2 is a flowchart illustrating a method of controlling an electronic device according to an example embodiment of the disclosure;

FIG. 5 is a flowchart illustrating a process of performing a high-speed capture using a first camera by an electronic device according to an example embodiment of the disclosure;

DETAILED DESCRIPTION

Hereinbelow, the disclosure will be described in detail with reference to the drawings. It is understood that various elements and regions in the figures may be shown out of scale. Accordingly, the scope of the disclosure is not limited by the relative sizes or spacing drawn from the accompanying drawings.

In the disclosure, expressions such as "A or B," "at least one of A or/and B," or "one or more of A or/and B" may include all possible combinations of the items that are enumerated together. For example, the term "at least one of A [or/and] B" means (1) including at least one A, (2) including at least one B, or (3) including both at least one A and at least one B.

As used herein, the terms "first," "second," or the like may denote various components, regardless of order and/or importance, and may be used to distinguish one component from another, and does not limit the components.

If a certain element (e.g., first element) is described as "operatively or communicatively coupled with/to" or "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

The term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Figure 1A:
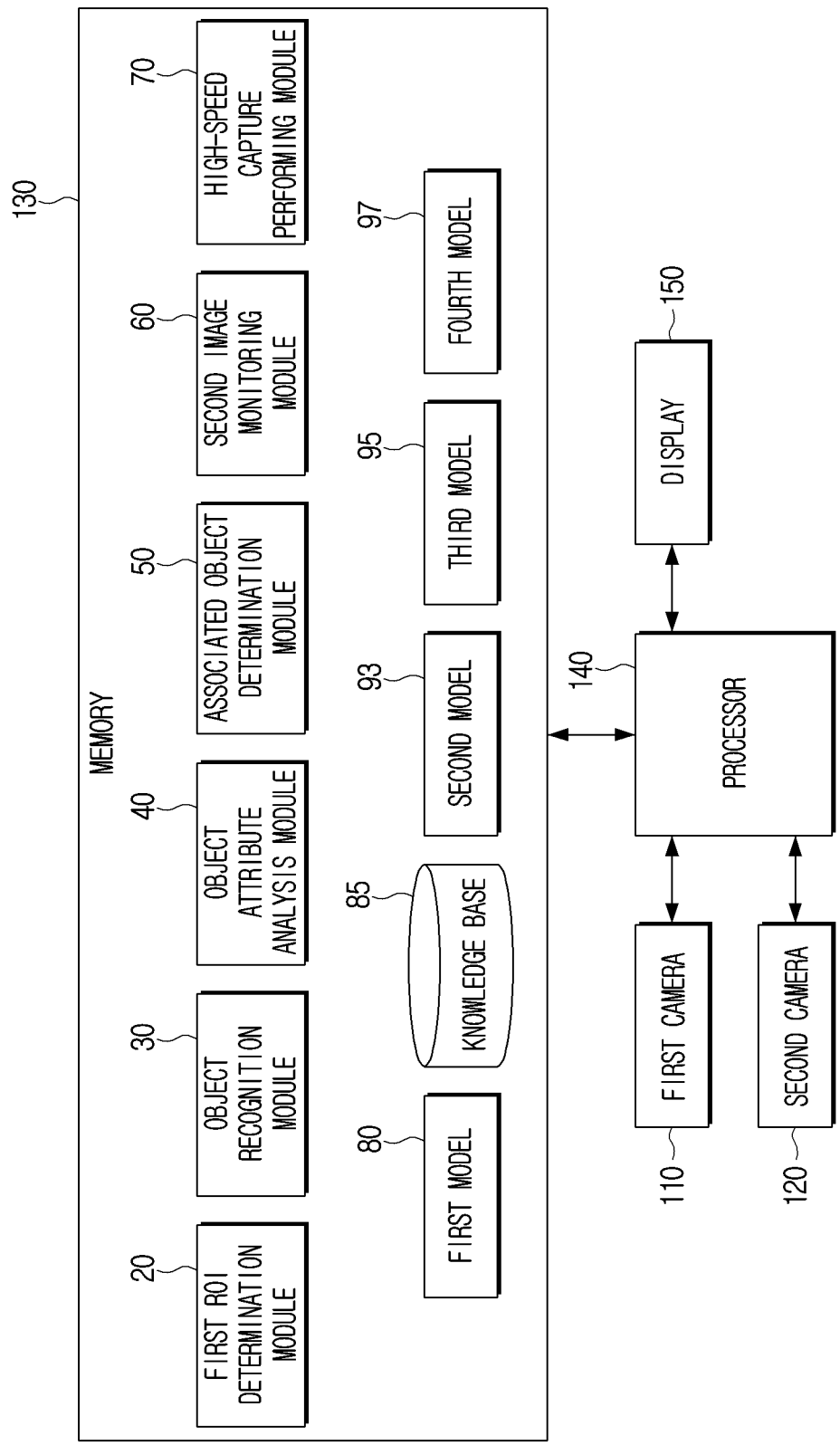
FIG. 1A is a block diagram briefly illustrating a configuration of an electronic device according to an example embodiment of the disclosure.

FIG. 1A is a block diagram for describing a configuration and an operation of an electronic device 100 according to an example embodiment of the disclosure. According to an example embodiment of the disclosure, the electronic device 100 may be implemented as a user terminal device such as a smartphone, a tablet personal computer (PC), a desktop PC, a laptop PC, a netbook computer, and a wearable device, but is not limited thereto. The electronic device 100 of the disclosure may be implemented by various devices including a camera.

As shown in FIG. 1A, the electronic device 100 may include a first camera 110, a second camera 120, a memory 130, a processor 140, and a display 150. However, the configuration illustrated in FIG. 1A is an example for implementing example embodiments of the disclosure, and appropriate hardware and software configurations that are obvious to those skilled in the art may be additionally included in the electronic device 100. For example, according to another example embodiment, the number of cameras may be different than two.

According to an example embodiment, the first camera 110 may obtain one or more images by capturing the surroundings of the electronic device 100. The first camera 110 may obtain a first image by capturing the surroundings of the electronic device 100. The first camera 110 may obtain a first image composed of a plurality of image frames obtained by capturing the periphery of the electronic device 100, and the first image may include a live view. For example, the first camera 110 may obtain a first image composed of a plurality of image frames obtained by capturing an area surrounding the electronic device 100. That is, the first camera 110 may obtain the first image by capturing objects in a field of view (FOV) of the first camera 110. In addition, a first image composed of a plurality of image frames may be stored in a buffer among the memory 130 temporarily storing information. A first lens having a first focal length may be included in the first camera 110.

The second camera 120 may obtain one or more images by capturing the surroundings of the electronic device 100, such as the first camera 110. The second camera 120 may obtain a second image composed of a plurality of image frames obtained by capturing the surroundings of the electronic device 100, and the second image may include a live view.

The second camera 120 may be located within a threshold distance from the first camera 110 on the electronic device 100. The threshold distance may be a predetermined value through an experiment, a research, or the like, but is not limited thereto, and may be changed in a manufacturing operation of the electronic device 100.

A second focal length of a second lens included in the second camera 120 may be different from a first focal length of the first lens included in the first camera 110. For example, the second focal length of the second lens included in the second camera 120 may be shorter than the first focal length of the first lens included in the first camera 110.

For example, an ultra-wide lens may be included in the second camera 120, and a wide-lens may be included in the first camera 110. The second camera 120 may have a larger field of view (FOV) than the first camera 110. Accordingly, when the first camera 110 and the second camera 120 capture the surroundings of the electronic device 100 at a position spaced apart from each other by a threshold distance, the second image obtained through the second camera 120 may be composed of an image frame including a wider area than the first image obtained through the first camera 110.

However, this is merely an example embodiment, and the second focal length of the second lens included in the second camera 120 may be longer than the first focal distance of the first lens included in the first camera 110. For example, the second camera 120 may include a wide-angle lens, and the first camera 110 may include an ultra-wide lens.

Each of the first camera 110 and the second camera 120 may include an image sensor (for example, a complementary metal oxide semiconductor (CMOS) image sensor or a charge coupled device (CCD) image sensor). The image sensor may be turned off or turned on depending on whether power is applied to the image sensor.

According to an example embodiment, a state in which each of the first camera 110 and the second camera 120 is deactivated may mean a state in which an image sensor included in each of the first camera 110 and the second camera 120 is turned off or a state in which an image sensor included in each of the first camera 110 and the second camera 120 is turned on, but a plurality of image frames obtained by each of the first camera 110 and the second camera 120 using an image sensor are not stored in a buffer.

When each of the first camera 110 and the second camera 120 is activated, an image sensor included in each of the first camera 110 and the second camera 120 is turned on, and a plurality of image frames obtained by each of the first camera 110 and the second camera 120 using an image sensor are stored in a buffer, or a plurality of image frames stored in a buffer are being displayed on the display 150 by the processor 140. According to an example embodiment, the activation of the second camera 120 means that the second camera 120 is switched from a deactivated state to an activated state.

The memory 130 may store programs, software codes, instructions or algorithms for implementing or performing one or more operations of the electronic device, including, but not limited to, the SSM operation. According to an example embodiment, the memory 130 may further store data related to one or more operations of the electronic device, including, but not limited to, at least one another element of the electronic device 100. The instruction means one action statement which may be executed directly by the processor 140 in a programming language, and is a minimum unit for the execution or operation of the program. The memory 130 is accessed by the processor 140 and operations of reading, writing, modifying, deleting or updating of data by the processor 140 may be performed.

According to an example embodiment of the disclosure, the term memory may include the memory 130, read-only memory (ROM) in the processor 140, RAM, or a memory card (for example, a micro secure digital (SD) card, and a memory stick) mounted to the electronic device 100.

The memory 130 may store a software module for determining a time point for performing an SSM operation through the first camera 110 based on a first image and a second image, and data corresponding to each module to perform various operations. A module for determining a time point at which the first camera 110 performs an SSM operation may include a first region of interest (ROI) determination module 20, an object recognition module 30, an object attribute analysis module 40, an associated object determination module 50, a second image monitoring module 60, and a high-speed capture performing module 70.

According to an example embodiment, the SSM operation means an operation of obtaining a super slow motion image by capturing the surroundings of the electronic device 100 at a high-speed (for example, 480 frames per second (fps) or 960 fps, etc.), and slowly playing the obtained super slow motion image (for example, reproducing the obtained super slow motion image by 32 times or 4 times slower than a general slow motion (240 fps)). The SSM operation may also be referred to as the SSM function. For example, the electronic device or the camera may have the SSM function. Through the SSM operation, a user may efficiently detect a rapid movement or a fine change of an object which is difficult to be identified by the naked eye. Meanwhile, a playback speed or a capturing speed associated with the SSM operation is not limited to the above-described exemplary numerical values, and may be set to various values by a user.

The super slow motion image captured by performing the SSM operation through the first camera 110 may be an image having a relatively high frame rate (for example, 480 fps or 960 fps). Meanwhile, the frame rate corresponding to the SSM operation may be a predetermined value, but may be changed by a user.

According to an example embodiment, a first ROI determination module 20 is a module for determining a first ROI on a first image obtained through the first camera 110 and obtaining information about the determined first ROI. Here, the first ROI of the first image means a partial region obtained for image analysis in the first image. According to an example embodiment, the partial region may be selected or determined for the image analysis.

According to an example embodiment, the first ROI determination module 20 may automatically determine a first ROI on the first image by using a third model 95 trained to determine an ROI or by using an auto focus method. According to another example embodiment, the first ROI determination module 20 may determine, as a first ROI, a region in which a user touch is input on a first image displayed on the display 150.

The first ROI determination module 20 may obtain information about the determined first ROI. For example, the information on the first ROI may include feature information of the image included in the first ROI and an indicator indicating the first ROI. According to an example embodiment, the feature information may be, for example, pixel value, luminance, chromaticity information, etc. of the image included in the first ROI. According to an example embodiment, the indicator may be information about the size or shape of a bounding box corresponding to the first ROI. The indicator indicating the first ROI may have a predetermined size or shape, but is not limited thereto, and may be changed by a user command. The first ROI determination module 20 may obtain feature information of an image included in the first ROI by analyzing an image included in the first ROI.

According to an example embodiment, the object recognition module 30 is a module for obtaining information on a first object by recognizing a first object included in a first ROI by using a first model 80. Specifically, the object recognition module 30 may obtain information on a first object included in a first ROI by inputting, to the first model 80, information on a first ROI obtained through the first ROI determination module 20. The information on the first object may include, for example, a type of the first object, a size of the first object, and information on a position change amount of the first object based on a plurality of frame images included in the first image. That is, the first object recognition module 30 may recognize a first object included in the first ROI by obtaining information on the first object.

According to an example embodiment, the object attribute analysis module 40 is a module for analyzing an attribute of a first object based on information on a first object obtained through the object recognition module 30 so as to identify whether the first object is a moving object. The attribute may be a dynamic attribute or a static attribute. For example, the object attribute analysis module 40 may identify a position change amount of a first object on a plurality of image frames constituting a first image among information on the first object, and analyze an attribute of the first object based on the identified position change amount of the first object. The object attribute analysis module 40 may output information related to whether the first object is a moving object according to an attribute of the first object.

According to an example embodiment, the associated object determination module 50 is a module for identifying whether there is another node connected to a first node including a type of a first object in a knowledge base 85, and identifying information included in another node. That is, the associated object determination module may identify whether information about a second object associated with the first object is present based on information about the first object (e.g., a type for the first object, etc.).

A type of a second object associated with (or related to) the type of the first object may be included in another node connected to the first node including the type of the first object. A type of a second object (or a type of an associated object of the first object) associated with the type of the first object means a type of object that is predicted to appear in a peripheral area of the first object. For example, when the type of the first object is a goal post, the type of the second object may be implemented as a soccer ball that is predicted to appear in the peripheral area of a goal post. In this case, the second object may be a singular number (i.e., one second object). However, the disclosure is not limited thereto, and as such, according to another example embodiment, two or more second objects may be provided.

That is, the associated object determination module 50 may identify a first node including the type of the first object in the knowledge base 85 by using the type of the first object among the information on the first object obtained through the object recognition module 30. The associated object determination module 50 may identify whether there is another node connected to the first node identified in the knowledge base 85. If it is identified that there is another node (e.g., a second node) connected to the first node, the associated object determination module 50 may obtain (or identify) the type of the second object included in the second node.

The associated object determination module 50 may obtain information about the relationship between the type of the first object and the type of the second object by using the knowledge base 85. For example, an edge connecting the first node and the second node in the knowledge base 85 may include information about a relationship between the type of the first object and the type of the second object.

The information on the relationship may include information related to various relationships between the type of the first object and the type of the second object. For example, the information on the relationship may include information about a direction relationship between the type of the first object and the type of the second object. The information about the direction relationship may include direction information corresponding to a location at which a probability that the second object appears or exists based on the current location of the first object. However, the disclosure is not limited thereto, and as such, according to another example embodiment, the information may include other information to identify a relationship between the location of the first objection and the second object.

The second image monitoring module 60 is a module for determining a second ROI among second images obtained through the second camera 120 based on the type of the second object obtained through the associated object determination module 50 and the information on the relationship between the type of the first object and the type of the second object, and identifying whether the second object appears in the second ROI by monitoring the second ROI. The second ROI means an area determined (or set) to monitor whether a second object appears in the second image.

According to an example embodiment, the second image monitoring module 60 may determine, as a second ROI, a region in which a second object of the second image is predicted to appear, based on the information on the relationship between the type of the first object and the type of the second object. For example, when information about a relationship including information indicating that a second object appears in a region corresponding to the left direction of the first object through the associated object determination module 50 is obtained, the second image monitoring module 60 may determine a region corresponding to the left direction of the first object as a second ROI based on the current position of the first object. In this case, the second ROI may be set on a region in which the first image and the second image do not overlap, but is not limited thereto.

The second image monitoring module 60 may determine a second ROI on the second image, and obtain information about the second ROI. For example, the second image monitoring module 60 may obtain feature information on an image included in the second ROI and indicator information indicating the size, shape, and the like of the second ROI.

For example, the second image monitoring module 60 may determine a second ROI and analyze the image included in the second ROI to obtain feature information about the image included in the second ROI. Here, the indicator indicating the second ROI may have a predetermined size or shape. However, the disclosure is not limited thereto, and as such, according to an example embodiment, the second ROI may be adjusted or changed by a user.

The second image monitoring module 60 may identify whether a second object appears on a second ROI. For example, the second image monitoring module 60 may obtain information on whether an object corresponding to the type of the second object appears in the second ROI by inputting the feature information on the image included in the second ROI and the type of the second object to the second model 93.

In another example embodiment, the second image monitoring module 60 may identify information related to a type of a second object from among features related to types of objects included in a plurality of nodes in a knowledge base 85. The features related to types of objects included in the plurality of nodes in the knowledge base 85 may be features collected in a database. The second image monitoring module 60 may monitor whether information related to the identified type of the second object is extracted from the second ROI to identify whether the second object appears in the second ROI.

According to an example embodiment, the high-speed capture performing module 70 is a module for performing a high-speed capture of the first camera 110 when information indicating that a second object appears is obtained in a second ROI through the second image monitoring module 60. For example, the high-speed capture performing module 70 may implement a control operation to perform the high-speed capture of the first camera 110 when information indicating that a second object appears is obtained in a second ROI through the second image monitoring module 60. According to an example embodiment, the control operation implemented by the high-speed capture performing module 70 so that the first camera 110 performs the high-speed capture means that the SSM operation (or SSM function) begins to be performed.

According to an example embodiment, the memory 130 may store information corresponding to the first model 80 and the second model 93 trained to recognize an object to perform an object recognition operation. For example, the memory may store the first model 80 and the second model 93.

The first model 80 is an artificial intelligence (AI) model trained to recognize an object included in a first ROI and output information on the recognized object when information on a first ROI included in the first image is input by the object recognition module 30. Here, the information on the first ROI may include information on an image included in the first ROI (for example, chromaticity, luminance, etc. of pixels constituting the image).

The second model 93 is an artificial intelligence model trained to output information about whether an object corresponding to the type of the second object is included in the second ROI if information about an image included in the second ROI (for example, various feature information such as chromaticity and luminance of a pixel constituting an image included in a second ROI) and the type of the second object by the second image monitoring module 60.

For example, when the information on the image included in the second ROI and the type of the second object are input, the second model 93 may identify whether feature information related to the type of the second object is output on the image included in the second ROI, and when feature information related to the type of the second object is extracted, output information indicating that the object corresponding to the type of the second object is included in the second ROI.

The first model 80 and the second model 93 may include an artificial neural network trained to output feature information corresponding to the input image. According to various example embodiments, the neural network may include, but is not limited to, unless otherwise specified, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

FIG. 1 illustrates an example embodiment, in which, the first model 80 and the second model 93 are implemented as separate models. However, the disclosure is not limited thereto, and as such, according to another example embodiment, the first model 80 and the second model 93 may be implemented in a same model. For example, the first model 80 and the second model 93 may be combined into a single model. According to another example embodiment, more than two models may be provide to implement the first model 80 and the second model 93.

According to an example embodiment, the memory 130 may store information corresponding to a third model 95 to perform an operation of determining a ROI in a first image. For example, the memory may store the third model 95. The third model 95 is an artificial intelligence model trained to determine a ROI in the input first image. For example, the third model 95 may be trained to determine an area in which at least one object included in the first image is present as a ROI.

According to an example embodiment, the memory 130 may store information corresponding to a fourth model 97 to perform an operation. For example, the memory may store the fourth model 97. The fourth model 97 refers to an artificial intelligence model trained to output a type of a second object associated with the type of the first object or output information indicating that there is no second object associated with the first object when the label corresponding to the type of the first object or the image of the first object is input.

The memory 130 may store a knowledge base 85 including information related to each of a plurality of objects. The knowledge base 85 may include a plurality of nodes including a type of a plurality of objects and an edge including information about a relationship between the plurality of objects.

Figure 1B:
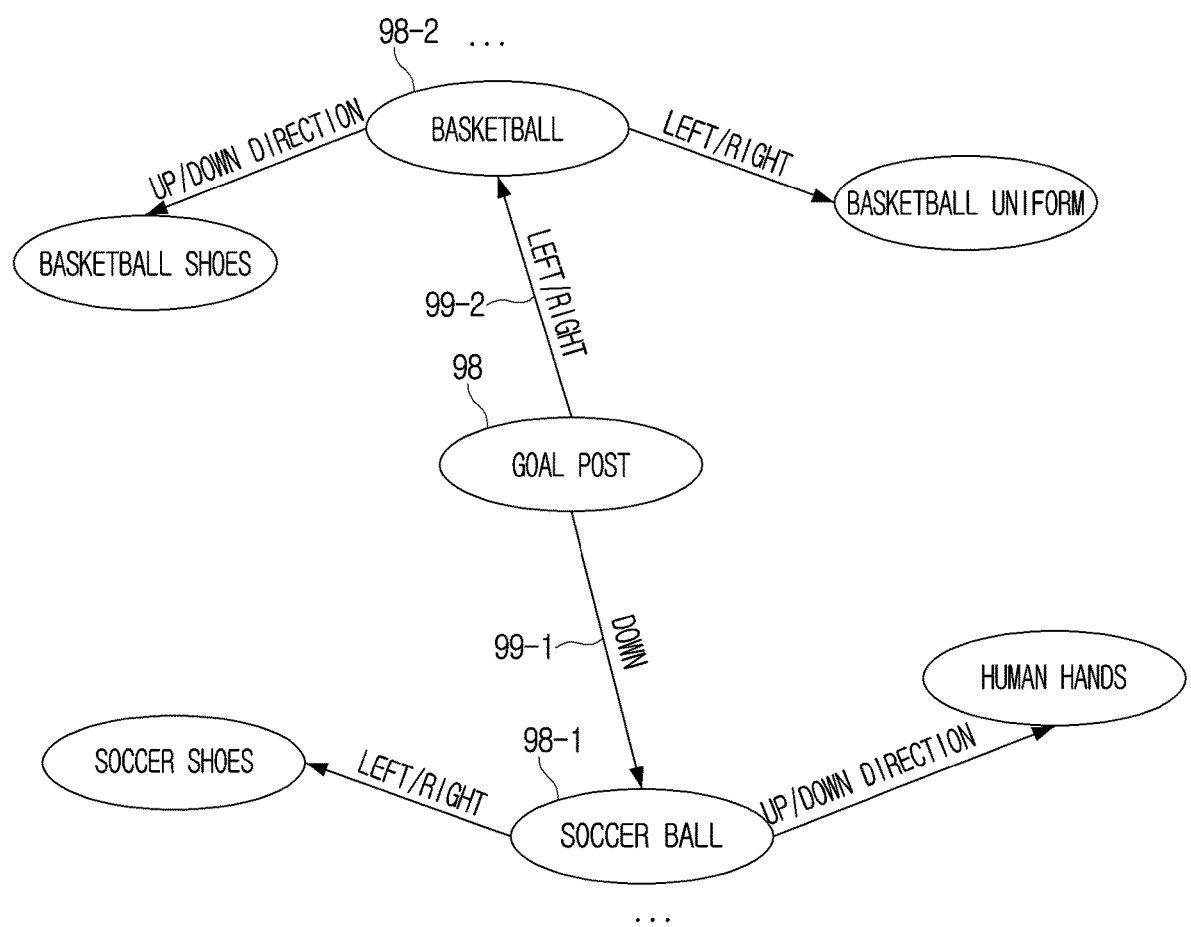
FIG. 1B is a diagram illustrating a structure of a knowledge base according to an example embodiment of the disclosure.

According to an example embodiment, as illustrated in FIG. 1B, the knowledge base 85 may be implemented in the form of a knowledge graph including an edge including information about a relationship between a plurality of objects and a node including a type of a plurality of objects. However, the disclosure is not limited thereto, and as such, the knowledge base 85 may be implemented or depicted in various other forms according to other example embodiment.

According to an example scenario illustrated in FIG. 1B, it is assumed that the type of the first object is a goal post. In this example scenario, the knowledge base 85 may include a first node 98 including a type of the first object. In the knowledge base 85, the first node 98 and a second node 98-1 (a node including an object related to a type of a first object which is a soccer ball) may be connected by an edge 99-1 including information about a relationship being in a downward direction. In addition, in the knowledge base 85, the first node 98 and the third node 98-2 (a node including an object related to the type of the first object which is a basketball) may be connected by an edge 99-2 including information about a relationship being a left/right direction. In this case, the fact that the first node 98 and the second node 98-1 are connected by the edge 99-1 including the information about the relationship that the first node 98 and the second node 98-1 are downward may mean that the soccer ball, which is the type of the object included in the second node 98-1, is highly likely to be located in the lower region of the goal post, which is the type of the first object included in the first node 98.

The knowledge base 85 may be structured in the form of a knowledge graph as shown in FIG. 1B, but this is merely an example embodiment, and may be implemented in the form of various information bases structured to obtain information on a relationship between objects.

The memory 130 may include a working memory capable of recording, processing, or modifying information through access by the processor 140 and a storage memory for storing and preserving information.

According to an example embedment, a working memory may include at least one of a volatile random access memory (RAM) such as a dynamic RAM (DRAM), a static RAM (SRAM), or a synchronous dynamic RAM (SDRAM), and a nonvolatile RAM such as magnetoresistive RAM (MRAM) or phase-change RAM (PRAM). The storage memory may include at least one of various types of ROM memory (for example, one time programmable ROM (OTPROM), programmable ROM (PROM), erasable and programmable ROM (EPROM)), a magnetic memory device (for example, a hard disk, and the like) or various auxiliary storage devices.

The modules 20, 30, 40, 50, 60, 70 for determining a time point at which the first camera 110 performs an SSM operation may be stored in a storage memory. Data and knowledge base 85 required to operate the first model 80, the second model 93, the third model 95, and the fourth model 97 may be stored in a storage memory.

The working memory may be implemented in the form of being included in the processor 140 as one component of the processor 140, but this is merely an example embodiment, and the working memory may be implemented as a separate component separate from the processor 140.

The processor 140 is electrically connected to the memory 130 to control the overall operation and operation of the electronic device 100. The processor 140 may be configured with one or more processors to control the operation of the electronic device 100.

The processor 140 may load, to a working memory, modules 20, 30, 40, 50, 60, 70 for determining a time point at which the SSM operation stored in the storage memory is performed and data for performing various operations by the modules 20, 30, 40, 50, 60, 70. The processor 140 may load data required for performing various operations by the first model 80, the second model 93, the third model 95, the fourth model 97, and each model to a working memory. The processor 140 may load the knowledge base 85 into a working memory. The processor 140 may perform various operations through various modules and an artificial intelligence model based on the data loaded into the working memory. Here, the loading refers to an operation of retrieving data stored in a storage memory to a working memory and storing the data so that the processor 140 may access.

The processor 140 may load data corresponding to each of various modules 20, 30, 40, 50, 60, and 70 and various artificial intelligence models 80, 93, 95 and 97 to perform an operation at a time, but is not limited thereto. The processor 140 may load data corresponding to the knowledge base 85. The processor 140 may load data needed for each module and model to execute a particular operation regardless of the order.

In addition, when one of various modules or models is to execute a specific operation, the processor 140 may load only data corresponding to one of a module or a model to perform a specific operation. When the operation of the various modules 20, 30, 40, 50, 60, 70 and the various artificial intelligence models 80, 93, 95 and 97 is completed, data required to operate the completed module and the model may be deleted in the working memory.

The processor 140 may load the knowledge base 85 when loading the associated object determination module 50, but this is merely exemplary and may load the knowledge base 85 regardless of the order.

The processor 140 may obtain information on a first object included in a first image obtained by capturing the surroundings of the electronic device 100 through the first camera 110. Specifically, the processor 140 may obtain first image by capturing the surroundings of the electronic device 100 through the first camera 110, and obtain information on a first object included in the first image by applying a first model trained to recognize the object to the obtained first image.

More specifically, the processor 140 may determine a first ROI on a first image obtained using the first camera 110 through the first ROI determination module 20. The processor 140 may control the first image to be displayed on the display 150.

According to an example embodiment, the processor 140 may determine a region including at least one object as a first ROI by inputting a first image to a third model 95 trained to determine a ROI through a first ROI determination module 20. In another example embodiment, the processor 140 may determine, as a first ROI, a region in which at least one object exists on the first image by using an auto focus method through the first ROI determination module 20.

According to another example embodiment, the processor 140 may determine a region in which a user touch is input in the first image as the first ROI. The processor 140 may display a first ROI determined in the first image as an indicator having a size and shape. According to an example embodiment, the size and shape may be predetermined. For example, the shape may be a rectangle. According to an example embodiment, the processor 140 may determine a region in which a user touch is input from among the first images displayed on the display 150 as a first ROI, and control an indicator indicating the determined first ROI to be displayed on the display 150.

The processor 140 may input, to the first model 80, information about a first ROI obtained by the first ROI determination module 20 through the object recognition module 30, recognize a first object included in the first ROI, and obtain information on the recognized first object. The information on the first object may include, for example, a type of the first object, a size of the first object, and information on a position change amount or a movement direction of the first object based on a plurality of frame images included in the first image.

If it is identified that information about the second object associated with the first object is present based on the information about the first object, the processor 140 may obtain a second image through the second camera 120.

Specifically, the processor 140 may identify whether the first object is a moving object based on the information about the first object. The processor 140 may analyze whether the first object has a dynamic attribute or a static attribute based on the information on the first object through the object attribute analysis module 40, and identify whether the first object is a moving object. For example, the processor 140 may identify a position change amount of the first object on a plurality of image frames included in the first image among the information on the first object through the object attribute analysis module 40.

As an example, when the position change amount of the first object exceeds a first threshold value, the processor 140 may analyze that the first object includes an attribute that is dynamic, and may identify that the first object is a moving object. As another example, when the position change amount of the first object is less than or equal to the first threshold value, the processor 140 may analyze that the first object includes a static attribute, and may identify that the first object is an object that does not move. Here, the first threshold value may be a predetermined value, but may be changed by a user.

The processor 140 may activate the second camera 120 based on an identification result related to whether the first object is a moving object, and obtain a second image by using the activated second camera 120.

Specifically, when it is identified that the first object is an object that is not moving, the processor 140 may identify whether information (for example, a type of the second object) for a second object associated with the type of the first object is present based on the information on the first object (for example, the type of the first object).

According to an example embodiment, the processor 140 may identify, through the associated object determination module 50, a first node including a first object among a plurality of nodes included in the knowledge base 85. For example, the processor 140 may identify the first node by using information on the type of the first object among the information on the first object. The processor 140 may identify whether a second node connected to the first node by an edge exists in the knowledge base 85 through the associated object determination module 50.

For example, as shown in FIG. 1B, the knowledge base 85 may be implemented in the form of a knowledge graph including a node including a type of a plurality of objects and an edge having direction relationship information between the plurality of objects. The processor 140 may identify whether a node including the first object is connected to another node through an edge in the knowledge base 85 through the associated object determination module 50.

When the type of the first object is a goal post, the processor 140 may identify a first node 98 including a goal post among a plurality of nodes included in the knowledge base 85 through the associated object determination module 50. In addition, the processor 140 may identify whether the first node 98 is connected to another node through an edge in the knowledge base 85 through the associated object determination module 50. Specifically, the processor 140 may identify that the first node 98 is connected to the second node 98-1 and the third node 98-2 through the edges 99-1, 99-2 in the knowledge base 85 through the associated object determination module 50.

According to another example embodiment, the processor 140 may identify whether a second object associated with the type of the first object exists by applying a rule-based algorithm predefined in a label corresponding to the type of the first object among the information on the first object through the associated object determination module 50. A label corresponding to the type of the first object means information indicating a characteristic of the type of the first object. The rule-based algorithm means an algorithm made to output an object type associated with the type of the first object when the label corresponding to the type of the first object is input. When the information on the object related to the type of the first object is not included in the rule-based algorithm, the processor 140 may identify that the object related to the type of the first object does not exist through the associated object determination module 50.

In another example embodiment, the processor 140 may identify a pixel value and a size of a second object associated with the first object based on a bounding box indicating a pixel value and a size of an image of a first object among the information on the first object through the associated object determination module 50. Here, the pixel value refers to a value representing a color attribute included in an image of the first object, and the bounding box refers to a box of a minimum size which may include all types of the first object.

Specifically, the processor 140 may identify a bounding box indicating a pixel value and a size of a second object, which may be associated with a first object, by using a bounding box indicating a pixel value and a size of an image of a first object through the associated object determination module 50. Information on a bounding box representing a pixel value and size of a second object that may be associated with a bounding box representing a pixel value and size of an image of the first object may be included in the associated object determination module 50.

In another example embodiment, the processor 140 may identify whether a second object associated with the type of the first object is present through the fourth model 97 in the associated object determination module 50. Specifically, the processor 140 may extract a label corresponding to the type of the first object from among the information on the first object, and input the extracted label to the fourth model 97 to obtain information on the type of the second object associated with the first object in the form of a label. Thereafter, whether a previously obtained second object type exists among object information obtained through the second model in the second image obtained from the second camera 120 may be identified.

When it is identified that another node connected to the first node exists in the knowledge base 85, the processor 140 may activate the second camera 120. For example, when it is identified that there is another node connected to the first node in the knowledge base 85, the processor 140 may activate the second camera.

The processor 140 may obtain a second image by capturing the surroundings of the electronic device 100 by using the activated second camera 120. When a second lens having a shorter focal length than the first camera 110 is included in the second camera 120, the second image is an image obtained by capturing a region wider than the first image, and thus the first image may be included in the second image. At this time, the processor 140 displays the first image on the display 150. However, since the plurality of image frames constituting the second image are stored in the buffer, the processor 140 may identify whether the second object exists in a region not overlapped with the first image and the second image by using the stored plurality of image frames. That is, the processor 140 may perform various operations based on the frame stored on the buffer since a region in which the second image and the first image do not overlap is not displayed on the display 150, but the corresponding region is stored in the buffer.

In another example, when a second lens having a focal length longer than that of the first camera 110 is included in the second camera 120, the first image is an image obtained by capturing a region wider than the second image, and thus a second image may be included in the first image.

The processor 140 may identify whether a second object of a type identified to be included in another node connected to the first node exists on the second image obtained through the second camera 120. According to an example embodiment, when information indicating that a second object of a type related to the type of the first object exists in a region located in a first direction of the first object by using the knowledge base 85, the processor 140 may detect a region corresponding to a first direction of the first object in the second image through the second image monitoring module 60 to identify whether the second object is present on the second image.

For example, when information indicating that a basketball ball, which is a second object of the type associated with the type of the first object, may be located in a region located in the left direction and the right direction of the goal post, which is the type of the first object, by using the knowledge base 85, the processor 140 may detect a region located in the left direction and the right direction of the goal post from among the second images through the second image monitoring module 60 to identify whether a basketball ball exists on the second image.

However, this is merely an example embodiment, and the processor 140 may identify whether a second object of a type associated with the type of the first object is present on the second image by entirely detecting the second image. That is, the processor 140 may identify the second object included in the second image based on the information obtained through the knowledge base 85, but may identify the second object by detecting the entire area of the second image.

When it is identified that a second object exists on the second image, the processor 140 may determine a second ROI on the second region based on the information about the relationship between the type of the first object and the type of the second object through the second image monitoring module 60.

For example, it is assumed that the processor 140 obtains information about a relationship in which a second object of a type associated with the type of the first object is located in a region corresponding to the first direction of the first object by using the knowledge base 85. The processor 140 may estimate a movement direction of the second object based on the first direction. For example, the processor 140 may estimate that the second object moves from a region located in a first direction of the first object (or a region in which the second object is currently located) in a direction toward the first object. For example, the processor 140 may estimate that the basketball moves from a region located in a left direction or a right direction of a currently located goal post in a direction toward the goal post.

In another example, the processor 140 may estimate a movement direction of the second object by using a position change amount or a movement direction of a second object on a plurality of image frames constituting the second image through the second image monitoring module 60. The processor 140 may determine, through the second image monitoring module 60, a second ROI in the second image based on the movement direction of the inferred second object. Specifically, the processor 140 may determine, as a second ROI, a region corresponding to the movement direction of the second object estimated based on a region in which the second object is located in the second image. The second ROI may be one, but two or more second regions of interest may be determined.

If it is identified that the second object appears on the second ROI determined through the second image monitoring module 60, the processor 140 may perform high-speed capturing using the first camera 110 through the high-speed capture performing module 70. That is, the processor 140 may determine a time point at which the second object moves and appears on the second ROI as a time point at which high-speed capture is performed by using the first camera 110 of the SSM operation. The SSM operation includes an operation of obtaining a super slow motion image by capturing the surroundings of the electronic device 100 at high speed by using a first camera 110, and an operation of reproducing the obtained super slow motion image by 32 times slower than a general image reproduction speed (30 fps) or 4 times slower than a general slow motion (240 fps).

The processor 140 may monitor whether a second object appears on the determined second ROI via the second image monitoring module 60. The processor 140 may monitor the second ROI to identify whether the second object appears on the second ROI.

For example, the processor 140 may identify whether an object corresponding to the type of the second object appears on the second ROI by inputting the feature information about the image included in the second ROI and the type of the second object in the second model 93 through the second image monitoring module 60.

As another example, the processor 140 may identify, through the second image monitoring module 60, information related to the type of the second object from among the database which collects features related to the type of the object included in the plurality of nodes in the knowledge base 85. The processor 140 may monitor whether information related to a type of the identified second object in the second ROI is extracted through the second image monitoring module 60 to identify whether the second object appears in the second ROI.

In another example embodiment of the disclosure, when it is identified that the first object is a moving object based on the information about the first object, the processor 140 may estimate the direction in which the first object moves through the object recognition module 30. Specifically, the processor 140 may estimate a moving direction of the first object by calculating a movement change amount or a movement direction of the first object on the plurality of image frames included in the first image.

The processor 140 may determine a third ROI on the first image based on the direction in which the first object moves. The third ROI means a region set to monitor whether a first object appears in the first image. For example, the processor 140 may determine, on the first image, a region corresponding to a direction in which the first object moves based on the direction in which the first object is present, as a third ROI. Here, the third ROI may be one ROI, but the disclosure is not limited thereto, and as such, two or more third ROIs may be provided. When it is identified that the first object appears on the third ROI, the processor 140 may perform high-speed imaging by using the first camera 110. An example embodiment related to the same will be described in detail in a part to be described later.

According to another example embodiment of the disclosure, when it is identified that there is no other node connected to the first node in the knowledge base 85, the processor 140 may monitor a state change of the first object included in the first ROI through the object recognition module 30. When it is identified that the state of the first object changes, the processor 140 may perform high-speed capture by using the first camera 110. For example, when the state change amount of the first object exceeds a second threshold value, the processor 140 may perform high-speed capture by using the first camera 110. That is, the processor 140 may determine a time point at which the state of the first object is changed as a time point at which high-speed capture is performed by using the first camera 110. An example embodiment related to the same will be described in detail with reference to FIG. 7.

In another example embodiment of the disclosure, the processor 140 may identify that the first object is not included in the first ROI based on the information about the first ROI. For example, when a user touch is input to a region in which a first object is not included in the first image displayed on the display 150, the processor 140 may determine a region in which a user touch, in which the first object is not included, as the first ROI. At this time, the processor 140 may identify that the first object is not included in the first ROI.

If it is identified that the first object is not included in the first ROI, the processor 140 may activate the second camera 120. The processor 140 may monitor whether an object exists on a region not overlapping the first image among the second images obtained by using the second camera 120 through the second image monitoring module 60.

Here, it is assumed that the second image is a live view obtained by capturing a region wider than the first image. When it is identified that a third object exists in a region not overlapping the first image in the second image, and when it is identified that the third object moves in the first image direction, the processor 140 may perform high-speed capture by using the first camera 110. The movement of the third object in the first image direction may mean that the third object moves in a region in which the first image and the first image overlap in a region in which the third object does not overlap the first image in the second image. An example embodiment related to the same will be described in detail with reference to FIGS. 4A and 4B.

According to another example embodiment of the disclosure, when performing high-speed capture by using the first camera 110, the processor 140 may obtain information about a relationship between a first ROI and a second ROI. For example, the information about the relationship between the first ROI and the second ROI may include information about relative positions of the first ROI and the second ROI, information about types of objects included in each of the first ROI and the second ROI.

The processor 140 may determine a time point at which the high-speed capture is to be performed by using the first camera 110 later based on the obtained information about the relationship between the first ROI and the second ROI.

For example, it is assumed that when performing high-speed capture using the first camera 110, a frame is included in the first ROI, a soccer ball is included in the second ROI, and a second ROI is set in the right region of the first ROI. Thereafter, when it is identified that the goal post is included in the first ROI determined on the first image obtained through the first camera 110, the processor 140 may set a second ROI on the right region of the first ROI based on the information on the relationship between the first ROI and the second ROI, and may infer that a soccer ball may be included in the second ROI. When a soccer ball appears in the second ROI, the processor 140 may perform high-speed capture using the first camera 110.

According to another example embodiment of the disclosure, it is assumed that a first image is an image obtained through an ultra wide-angle lens and a second image is an image obtained through a wide-angle lens. In this case, the processor 140 may determine an indicator indicating the outline (or boundary) of the first image as a first ROI. When a specific object appears in an indicator indicating the first ROI, the processor 140 may perform high-speed capture using the first camera 110.

The display 150 may display various information under the control of the processor 140. The display 150 may display a first image composed of a plurality of image frames obtained through the first camera 110. The display 150 may display (or reproduce) the super slow motion image obtained through the first camera 110 at 32 times slower than a general image reproduction speed (30 fps) or four times slower than a general slow motion (240 fps). However, this is merely an example embodiment, and the display 150 may display a super slow motion image at a speed set by a user.

The display 150 may be implemented as a touch screen together with a touch panel, and the display 150 may be implemented as a liquid crystal display panel (LCD), an organic light emitting diodes (OLED) display, or the like, and may be implemented as a flexible display, a transparent display, or the like. However, the embodiment is not limited to the above-described implementation, and the display 150 may be implemented differently depending on the type of the electronic device 100.

A operation related to artificial intelligence may be performed through the processor 140 and the memory 130. The processor 140 may include one or a plurality of processors. The one or a plurality of processors may be a general-purpose processor such as a central processor (CPU), an application processor (AP), a digital signal processor (DSP), a dedicated processor, or the like, a graphics-only processor such as a graphics processor (GPU), a vision processing unit (VPU), an AI-only processor such as a neural network processor (NPU), or the like.

The one or more processors 140 may control processing of the input data according to a predefined operating rule or AI model stored in the memory 130. If the one or a plurality of processor is an AI-only processor, the AI-only processor may be designed with a hardware structure specialized for the processing of a particular AI model.

The predefined operating rule or artificial intelligence model is provided through training or learning. Being provided through learning may refer, for example, to, by applying a learning algorithm to a plurality of learning data, a predefined operating rule or AI model of a desired characteristic being made. The learning may be performed in a device itself in which AI according to an example embodiment is performed, and/or may be implemented through a separate server/system.

Examples of learning algorithms include, but are not limited to, supervised learning, unsupervised learning, semi-supervised learning, or reinforcement learning.

The AI model may include a plurality of neural network layers. Each of the plurality of neural network layers includes a plurality of weight values, and may perform a neural network processing operation through an iterative operation leveraging results of a previous layer and a plurality of weight values. The plurality of weight values included in the plurality of neural network layers may be optimized by learning results of the AI model. For example, the weight values may be updated such that a loss value or a cost value obtained by the AI model is reduced or minimized during the learning process.

FIG. 2 is a flowchart illustrating a method of controlling an electronic device according to an example embodiment of the disclosure.

In operation S210, the electronic device 100 may obtain information on a first object included in a first image obtained by capturing the surroundings of the electronic device through the first camera. Specifically, the electronic device 100 may determine a first ROI on a first image. A process of determining a first ROI on a first image will be described in detail with reference to FIG. 3.

The electronic device 100 may identify whether the first object is included in the determined first ROI. When it is identified that the first object is included in the first ROI, the electronic device 100 may obtain information about a first object included in the first ROI by applying the information about the first ROI to a first artificial intelligence model trained to recognize an object. A process in which the electronic device 100 obtains information on a first object will be described in detail with reference to FIG. 3. An example in which the first object is not included in the first ROI will be described in detail with reference to FIG. 4A.

In operation S220, the electronic device 100 may obtain a second image through the second camera when it is identified that there is information on a second object associated with the first object based on the obtained information about the first object.

Specifically, the electronic device 100 may identify whether the first object is a moving object by using information on the first object. If it is identified that the first object is an object that does not move, the electronic device 100 may identify whether information (e.g., a type of the second object, etc.) for a second object associated with the type of the first object is present in the knowledge base. When it is identified that information about the type of the second object exists in the knowledge base, the electronic device 100 may activate the second camera. In addition, the electronic device 100 may obtain a second image by using the activated second camera. An example embodiment related to the same will be described in detail with reference to FIG. 3.

However, this is merely an example embodiment, and the electronic device 100 may identify whether a type of a second object associated with the type of the first object is present without using a knowledge base. Since the example embodiment related to the disclosure has been described above, repeated descriptions will be omitted.

The case in which the first object is identified as a moving object will be described in detail with reference to FIG. 6. In addition, the case where there is no information on the type of the second object associated with the type of the first object in the knowledge base will be described in detail with reference to FIG. 7.

In operation S230, the electronic device 100 may determine, based on whether a second object is included in the obtained second image, a time point at which high-speed capture is to be performed by using the first camera. When it is identified that a second object exists on the second image, the electronic device 100 may determine a second ROI based on the movement direction of the second object. The electronic device 100 may monitor whether a second object appears on the determined second ROI. When it is identified that the second object appears on the second ROI, the electronic device 100 may perform high-speed capture by using the first camera. An example embodiment related to the same will be described in detail with reference to FIG. 5.

Figure 3:
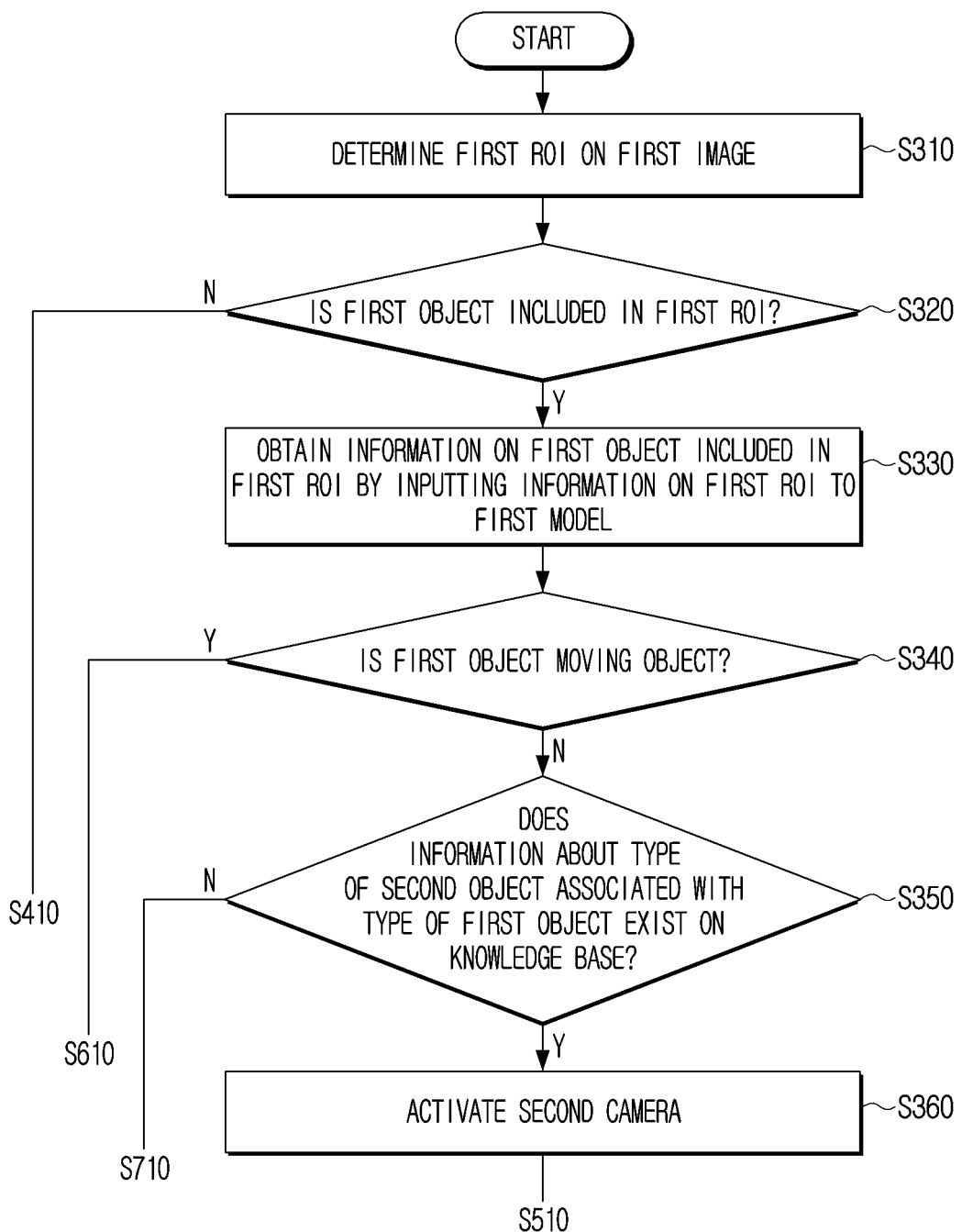
FIG. 3 is a flowchart illustrating a process of activating a second camera by an electronic device according to an example embodiment of the disclosure.

FIG. 3 is a flowchart illustrating a process of activating a second camera by an electronic device according to an example embodiment of the disclosure. For example, operations S310 to S330 of FIG. 3 provide additional details of the operation S210 in FIG. 2.

In operation S310, the electronic device 100 may determine the first ROI on the first image obtained through the first camera.

According to an example embodiment, the electronic device 100 may input a first image to a third model trained to determine a ROI to determine a region including at least one object as a first ROI. The third model may be an artificial intelligence model trained to determine a region including at least one object included in the first image as a ROI.

According to another example embodiment, the electronic device 100 may determine a first ROI on the first image by using an automatic focusing method. The automatic focusing refers to a operation of automatically focusing a specific object included in a first image. When one of the objects included in the first image is focused by the automatic focusing method, the electronic device 100 may determine a region including the focused object in the first image as the first ROI.

In another example embodiment, the electronic device 100 may determine, as a first ROI, a region in which a user touch is input, from among a first image displayed on a display including a touch screen. The electronic device 100 may display a bounding box having a predetermined size or shape in a region in which a user touch is input, and set a region in which the bounding box is displayed as a first ROI.

In operation S320, the electronic device 100 may identify whether the first object is included in the first ROI. Meanwhile, since the object is included in the first ROI when the third model or the automatic focusing method is used, the electronic device 100 may omit operation S320 and perform operation S330. That is, since the operation of determining the first ROI using the third model or the automatic focusing method includes identifying the first ROI with an object of interest, a separate operation for determining if the first objection is included in the first ROI may not be necessary. On the other hand, if the first ROI is determining based on an input from the user, operation S320 may be performed to identify whether the first object is included in the first ROI selected by the user.

It is assumed that a region in which the first object is not included is determined as a first ROI since a user touch is input to a region not including the first object among the first image displayed on the display. In this case, the electronic device 100 may identify that the first object is not included in the first ROI. A case in which the first object is not included in the first ROI will be described in detail with reference to FIG. 4A.

In operation S330, when a first object is included in the first ROI, the electronic device 100 may obtain information on a first object included in the first ROI by inputting information about the first ROI into a first model trained to recognize the object. The information on the first ROI may include feature information (for example, chromaticity, luminance, etc. of pixels constituting the image) and an indicator information (for example, a type of the first object, a size of the first object, and information on a position change amount of the first object based on a plurality of frame images included in the first image).

In operation S340, the electronic device 100 may identify whether the first object is a moving object by using the information on the first object. For example, the electronic device 100 may identify a position change amount of a first object on a plurality of image frames constituting a first image among information on a first object, and analyze an attribute of the first object based on the identified position change amount of the first object. The electronic device 100 may identify whether the first object is a moving object according to an attribute of the first object.

In operation S350, if it is identified that the first object does not move, the electronic device 100 may identify whether there is information on the type of the second object associated with the type of the first object in the knowledge base. An example embodiment related to whether information about the type of the second object associated with the type of the first object exists in the knowledge base has been described above, and thus a repeated description will be omitted.

If it is identified that there is information on the type of the second object associated with the type of the first object in the knowledge base, the electronic device 100 may activate the second camera. An example embodiment after the second camera is activated will be described in detail with reference to FIG. 5. When the first object is a moving object, it will be described in detail with reference to FIG. 6. A case where there is no information on the type of the second object associated with the type of the first object in the knowledge base will be described in detail with reference to FIG. 6.

Figure 4A:
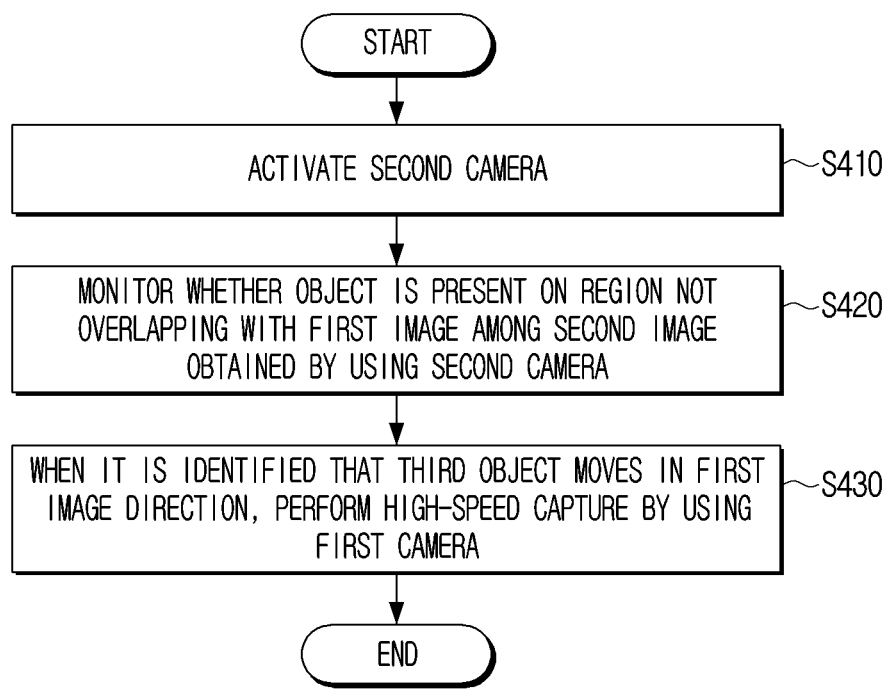
FIG. 4A is a flowchart illustrating a high-speed capture using a first camera by an electronic device according to an example embodiment of the disclosure.
Figure 4B:
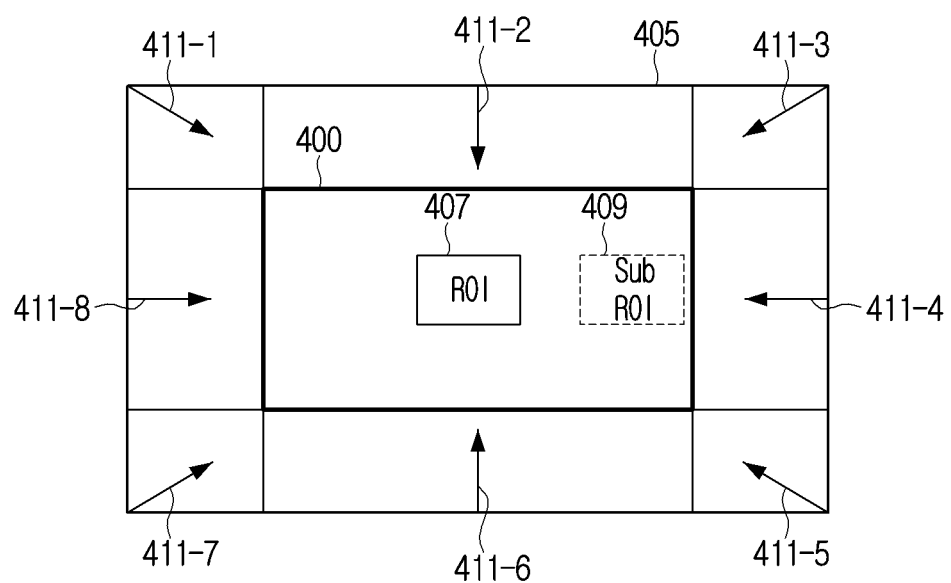
FIG. 4B is a diagram for illustrating the high-speed capture using the first camera.

FIG. 4A is a flowchart illustrating a process of performing high-speed capture by the electronic device 100 by using a first camera, according to an example embodiment of the disclosure. FIG. 4A is a flowchart specifically illustrating an example embodiment in a case in which a first object is not included in a first ROI 407 on a first image 400 (for example, as in operation S320-N in FIG. 3), and FIG. 4B is a diagram for illustrating the case in which the first object is not included in the first ROI 407.

In operation S410, when it is identified that the first object is not included in the first ROI, the electronic device 100 may activate the second camera. The electronic device 100 may obtain a second image by using the activated second camera. Here, it is assumed that the first image 400 is a wide-view and the second image 405 is an ultra-wide view having a wider view than the first image 400.

In operation S420, the electronic device 100 may monitor whether an object is present on a region not overlapping with the first image 400 among the second image 405 obtained by using the second camera.

In operation S430, when it is identified that a third object exists on a region in which the first image 400 of the second image 405 does not overlap, and when it is identified that the third object moves in the first image direction, the electronic device 100 may perform high-speed capture by using the first camera 110. In this case, the movement of the third object in the first image direction means that the third object moves in a direction in which the first image and the second image overlap in a region in which the first image and the second image overlap in a region in which the third object does not overlap the first image in the second image (for example, in the direction of arrows 411-1 to 411-8 in FIG. 4B).

According to another example embodiment of the disclosure, the electronic device 100 may set a second ROI (or sub-ROI) 409 in a region that does not overlap the first image in the second image. For example, as illustrated in FIG. 4B, the electronic device 100 may set a second ROI 409 in a region overlapping the first image and the second image. The electronic device 100 may monitor whether a specific object appears in the second ROI 409.

For example, when it is identified that the third object appears on the second ROI 409 while moving in the direction of an arrow 411-4, the electronic device 100 can perform high-speed capture by using the first camera. The electronic device 100 may perform an SSM operation while performing high-speed capture by using a first camera.

FIG. 5 is another example embodiment of the disclosure and a flowchart illustrating a process of performing a high-speed capture using a first camera by an electronic device, describing an operation after S360.

In operation S510, the electronic device 100 may obtain a second image by using the activated second camera. In operation S520, the electronic device 100 may identify whether a second object is present on the second image. According to an example embodiment, the electronic device 100 may identify whether a second object exists on a second image based on information included in a knowledge base. For example, the electronic device 100 may identify whether a second object exists on the second image based on information about a relationship between the type of the first object and the type of the second object included in the knowledge base (for example, direction relationship information between the type of the first object and the type of the second object, etc.).

In operation S530, if it is identified that a second object exists on the second image, the electronic device 100 may estimate the movement direction of the second object. In one embodiment, it is assumed that information indicating that a second object of a type associated with the type of the first object is located in a region corresponding to a first direction of the first object in the knowledge base 85 (i.e., information about a direction relationship) is included. The electronic device 100 may estimate a movement direction of the second object based on the first direction. Specifically, the electronic device 100 may infer that the electronic device 100 moves from a current position of the second object (for example, a region located in a first direction of the first object) toward the first object.

As another example embodiment, the electronic device 100 may estimate a direction in which the second object is to move by calculating a position change amount or a moving direction of the second object on a plurality of frames constituting the second image. For example, if it is calculated that the second object moves in the direction toward the first object by a first position change amount on the plurality of frames constituting the second image, the electronic device 100 may estimate that the second object moves in the direction toward the first object.

If it is identified that a second object is not present on the second image, the electronic device 100 may estimate a moving direction of the first object. An example embodiment related to the same will be described in detail with reference to FIG. 6.

In operation S540, the electronic device 100 may determine a second ROI on the second image based on the movement direction of the second object. Here, the second ROI means a region determined (or set) to monitor whether a second object appears in the second image. The electronic device 100 may determine, as a second ROI, a region corresponding to a movement direction of a second object, which is estimated based on a region in which a second object is located, of the second image. The second ROI may be one, but two or more second regions of interest may be determined.

In operation S550, the electronic device 100 may monitor whether the second object appears on the second ROI. According to an example embodiment, the electronic device 100 may obtain information on whether an object corresponding to the type of the second object appears in the second ROI by inputting the feature information of the image included in the second ROI and the type of the second object among the information about the second ROI of the second model 93.

As another example, the electronic device 100 may identify information related to a type of a second object from the database that collects features related to the type of the object included in the plurality of nodes in the knowledge base. In addition, the electronic device 100 may monitor whether information related to the identified type of the second object is extracted from the second ROI to identify whether the second object appears in the second ROI.

In operation S560, if it is identified that the second object appears on the second ROI, the electronic device 100 may perform high-speed capture by using the first camera. The electronic device 100 may determine a time point appearing on the second ROI while the second object moves, as a time point at which high-speed capture is performed by using the first camera.

Figure 6:
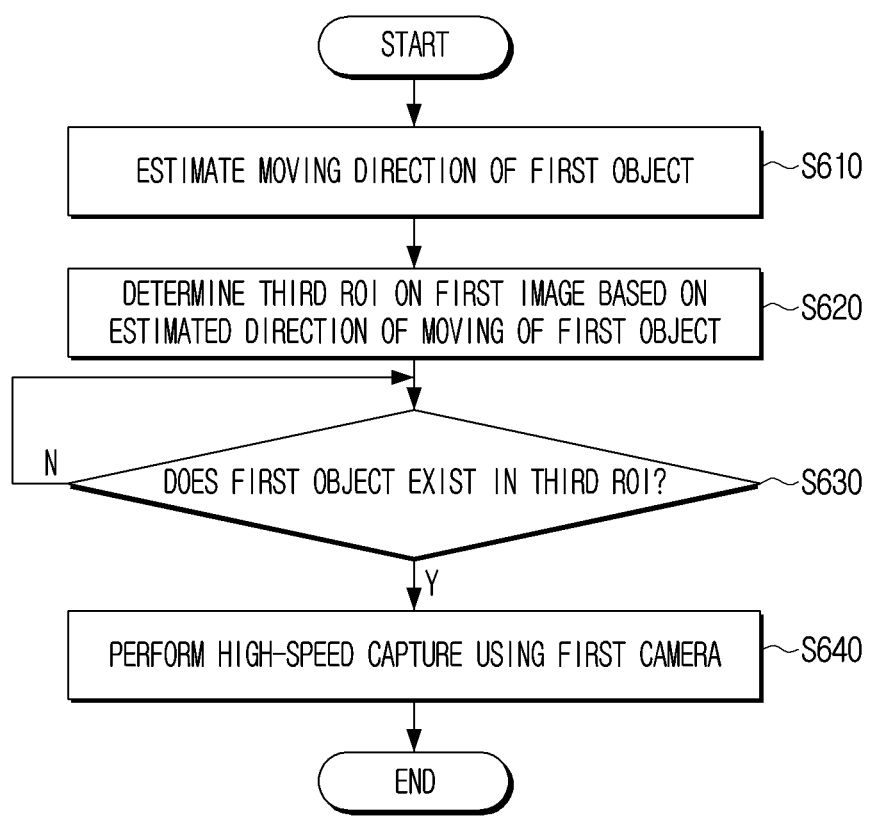
FIG. 6 is a flowchart illustrating a process of performing a high-speed capture using a first camera according to an example embodiment of the disclosure.

FIG. 6 is a flowchart illustrating a process of performing a high-speed capture using a first camera according to an example embodiment of the disclosure.

According to an example embodiment, if the first object is identified as a moving object in operation S340-Y of FIG. 3, the electronic device 100 may perform operation S610 of FIG. 6. In operation S610, the electronic device 100 may estimate a moving direction of the first object. Specifically, the electronic device 100 may estimate a moving direction of a first object by calculating a movement change amount or a movement direction of a first object on a plurality of image frames included in the first image.

In operation S620, the electronic device 100 may determine a third ROI on the first image based on the estimated direction in which the first object moves. The third ROI means a region set to monitor whether a first object appears in the first image. For example, the third ROI may be a region set to monitor whether the first object continues to appear in the first image. According to an example embodiment, the electronic device 100 may determine, on the first image, a region corresponding to a direction in which the first object moves based on the direction in which the first object is present, and a third ROI. Here, the third ROI may be one ROI or two or more ROIs.

In operation S630, the electronic device 100 may monitor whether the first object appears on the third ROI in operation S630. When it is identified that the first object appears on the third ROI, the electronic device 100 may perform high-speed capture by using the first camera. That is, when the first object included in the first image is a moving object, the electronic device 100 may determine a third ROI on the first image, and perform high-speed capture using the first camera based on whether the first object appears in the third ROI.

Figure 7:
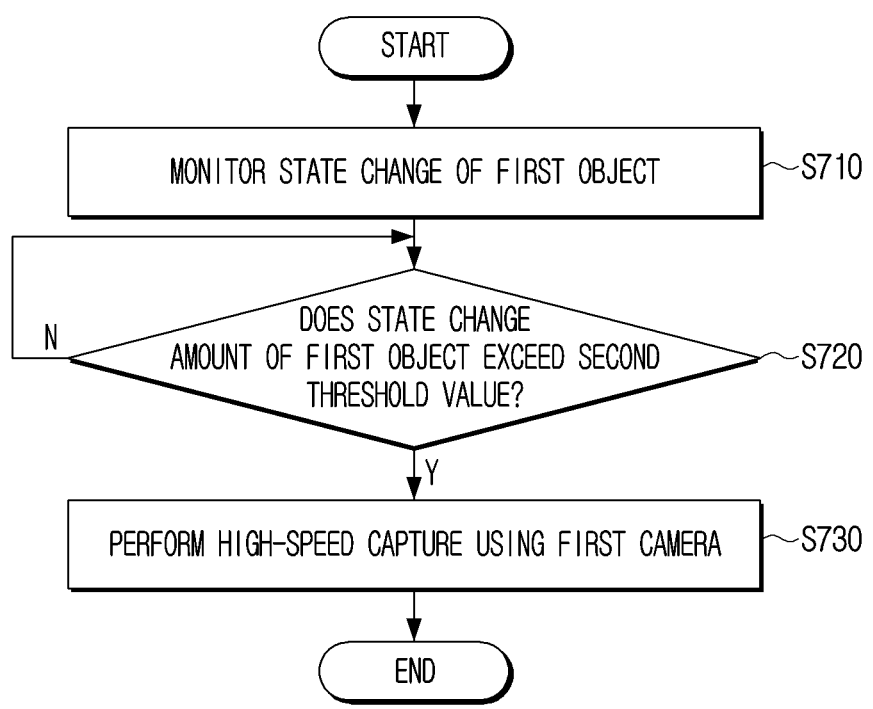
FIG. 7 is a flowchart illustrating a process of performing a high-speed capture using a first camera according to an example embodiment of the disclosure.

FIG. 7 is a flowchart for describing a process of determining a time point at which high-speed capture is performed by using a first camera, according to an example embodiment of the disclosure. In operation S710, if there is no information on the type of the second object associated with the type of the first object in the knowledge base in operation 350-N (FIG. 3) or if the second object does not exist on the second image in operation S520-N (FIG. 5), the electronic device 100 may monitor the state change of the first object.

In operation S720, the electronic device 100 may identify whether the state change amount of the first object exceeds a second threshold value. Here, the state change amount means that the degree of change of the physical quantity such as the size, volume, shape, and the like of the first object is digitized. The second threshold value may be a predetermined value calculated by an experiment, a research, or the like, but is not limited thereto, and may be changed by a user.

In an example embodiment, it is assumed that the first object is implemented as a balloon containing water. When a balloon containing water bursts, the shape or volume of a balloon containing water may be greatly changed. In this case, the electronic device 100 may identify that a state change amount of a balloon containing water exceeds a second threshold value.

In operation S710, when the state change amount of the first object is identified as exceeding the second threshold value, the electronic device 100 may perform high-speed capture by using the first camera. The electronic device 100 may determine a time point at which the state of the first object is changed as a time point for high-speed capture by using the first camera.

According to another example embodiment of the disclosure, when information (for example, color, contrast, pixel value, etc.) of an image representing a first object among the states of the first object is changed, the electronic device 100 may perform high-speed capture by using the first camera. For example, when a change amount of information of an image representing the first object (for example, a change in color of the image of the first object, etc.) exceeds a third threshold value, the electronic device 100 may perform high-speed capture by using the first camera.

Figure 8:
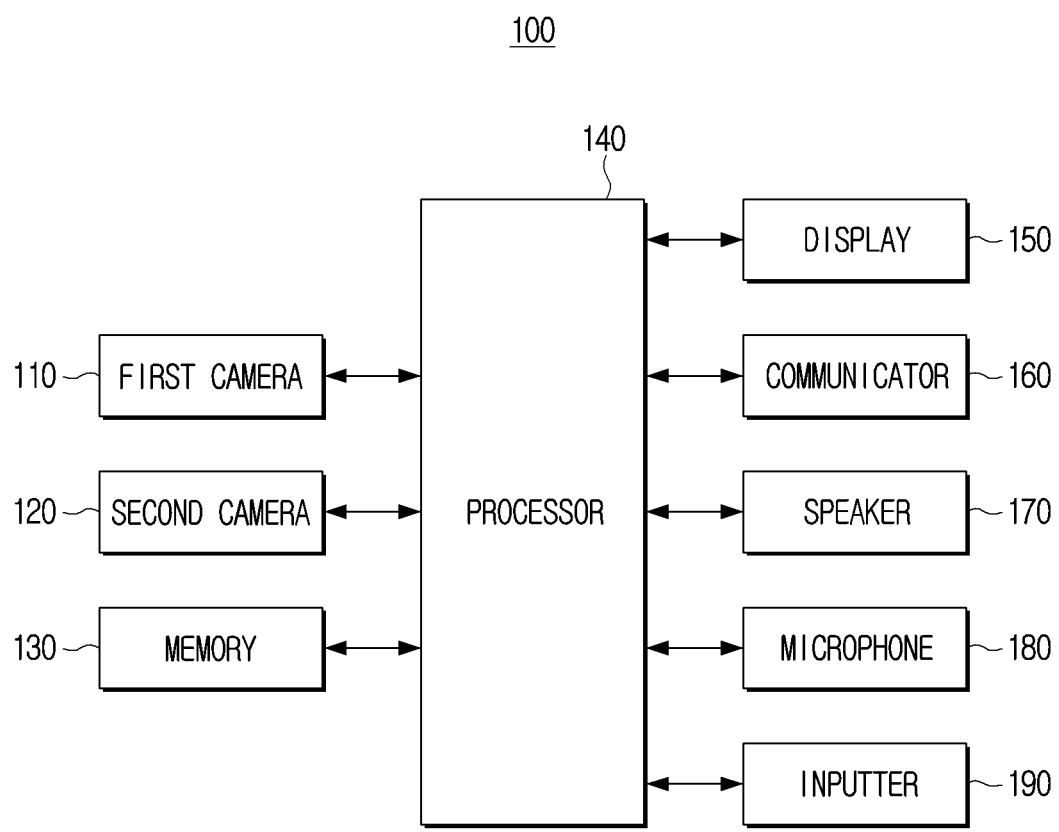
FIG. 8 is a block diagram specifically illustrating a configuration of an electronic device according to an example embodiment of the disclosure.

FIG. 8 is a block diagram illustrating in detail the configuration of the electronic device 100 according to another example embodiment of the disclosure. As shown in FIG. 8, the electronic device 100 may include the first camera 110, the second camera 120, the memory 130, the processor 140, the display 150, a communicator 160, a speaker 170, a microphone 180, and an inputter 190. The first camera 110, the second camera 120, the memory 130, the processor 140, and the display 150 have been described in detail with reference to FIG. 1A and will not be further described.

The communicator 160 may include a circuit and communicate with an external device. Communication of the communicator 160 with an external device and an external server may include communication through a third device (e.g., a relay, a hub, an access point, a server, a gateway, etc.).

The communicator 160 may include various communication modules to perform communication with an external device. For example, the communicator 160 may include a wireless communication module, for example, may include cellular communication using any one of the following, for example, $5^{th}$ generation (5G), long-term evolution (LTE), LTE advanced (LTE-A), a code division multiple access (CDMA), a wideband CDMA (WCDMA), and the like.

As another example, the wireless communication module may include, for example, at least one of wireless fidelity (WiFi), Bluetooth (BT), Bluetooth low energy (BLE), ZigBee, radio frequency (RF), or body area network (BAN).

However, this is merely an example embodiment, and the communicator 120 may include a wired communication module.

The first model 80, the knowledge base 85, the second model 93, the third model 95, and the fourth model 97 illustrated in FIG. 1 may be included in an external server. The communicator 160 may receive the knowledge base 85 from an external server.

According to an example embodiment, the communicator 160 may transmit information about the first ROI to an external server including the first model 80 and may receive information about the first object from an external server.

In another example embodiment, the communicator 160 may transmit the information on the image included in the second ROI and the type of the second object to an external server including the second model 93, and receive information indicating whether an object corresponding to the type of the second object is included in the second ROI from the external server.

According to another example embodiment, the communicator 160 may transmit a first image to an external server including the third model 95 and receive information on a region set as a first ROI among the first images inputted from an external server. The processor 140 may determine a first ROI in the first image based on the information about the region set as the first ROI obtained through the communicator 160.

In another example embodiment, the communicator 160 may transmit a label corresponding to the type of the first object or an image of the first object to an external server including the fourth model 97, and receive, from the external server, information indicating the type of the second object associated with the type of the first object or the second object associated with the first object.

The speaker 170 outputs various audio data in which various processing operations such as decoding, amplification, and noise filtering are performed by an audio processing unit. In addition, the speaker 170 may output various notification sounds or voice messages.

For example, the speaker 170 may output a notification sound indicating a time point at which high-speed capture is performed by using the first camera 110. As another example, the speaker 160 may output audio data included in the SSM image.

The microphone 180 is a configuration capable of receiving a voice from a user. The microphone 180 may be provided inside the electronic device 100, but may be provided outside and electrically connected to the electronic device 100. In addition, when the microphone 180 is externally provided, the microphone 180 may transmit a user voice signal generated through a wired/wireless interface (for example, Wi-Fi, Bluetooth) to the processor 140.

The microphone 180 may receive a user voice including a wake-up word (or a trigger word) capable of waking up a dialog system which is an artificial intelligence model capable of recognizing and understanding a voice input from a user. The microphone 180 may receive a user voice including a command for performing high-speed capture using the first camera 110. The processor 140 may input, to the dialogue system, a user voice including a command to perform high-speed capture obtained through the microphone 180. The processor 140 may perform high-speed capture using the first camera 110 based on the information obtained through the dialogue system.

The inputter 190 includes a circuit and may receive a user input for controlling the electronic device 100. The inputter 190 may include a touch panel for receiving a user touch using a user hand or a stylus pen, and a button for receiving user manipulation, or the like. As another example, the inputter 190 may be implemented as another input device (e.g., a keyboard, a mouse, a motion inputter, or the like). The inputter 170 may receive various user commands.

However, it should be understood that the disclosure is not limited to the specific example embodiments described hereinafter, but includes various modifications, equivalents, and/or alternatives of the example embodiments of the disclosure. In relation to explanation of the drawings, similar drawing reference numerals may be used for similar constituent elements throughout the disclosure.

In the disclosure, expressions such as "have," "may have," "include," "may include" or the like represent presence of a corresponding feature (for example, components such as numbers, operations, operations, or parts) and does not exclude the presence of additional feature.

The various example embodiments as described above may be implemented with software including instructions stored in the machine-readable storage media readable by a machine (e.g., a computer). A machine is a device which may call instructions from the storage medium and operate according to the called instructions, and may include a server cloud according to the example embodiments. When the instructions are executed by a processor, the processor may perform an operation corresponding to the instructions directly or by using other components under the control of the processor.

Terms such as "module," "unit," "part," and so on are used to refer to an element that performs at least one operation or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium. For example, "non-transitory storage medium" may refer to a buffer temporarily storing data.

According to an example embodiment, the method according to various example embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

Each of the elements (e.g., a module or a program) according to various example embodiments may be comprised of a single entity or a plurality of entities, and some sub-elements of the abovementioned sub-elements may be omitted, or different sub-elements may be further included in the various example embodiments. Alternatively or additionally, some elements (e.g., modules or programs) may be integrated into one entity to perform the same or similar operations performed by each respective element prior to integration. Operations performed by a module, a program, or another element, in accordance with various example embodiments, may be performed sequentially, in a parallel, repetitively, or in a heuristically manner, or at least some operations may be performed in a different order, omitted or a different operation may be added.

What is claimed is:

1. An electronic device comprising:
a first camera comprising a first lens having a first focal distance;
a second camera comprising a second lens having a second focal distance different from the first focal distance;
a memory storing one or more instructions; and
a processor configured to execute the one or more instructions to:
obtain first information corresponding to a first object included in a first image obtained by the first camera,
identify second information corresponding to a second object associated with the first object based on the first information corresponding to the first object,
obtain a second image through the second camera based on identifying the second information, and
determine a time to perform high-speed capture using the first camera based on whether the second object is included in the second image.

2. The electronic device of claim 1, wherein the processor is further configured to:
determine information on a first region of interest (ROI) in the first image, and
obtain the first information corresponding to the first object in the first ROI by applying the information on the first ROI to a first model trained to perform object recognition.

3. The electronic device of claim 1, wherein the memory further stores knowledge base comprising information related to a plurality of objects,
wherein the processor is further configured to:
identify whether the first object is a moving object based on the first information corresponding to the first object,
based on identifying that the first object is a non-moving object, identify whether information about a type of a second object associated with a type of the first object exists in the knowledge base, and
based on identifying that the information about the type of the second object exists in the knowledge base, obtain the second image by activating the second camera.

4. The electronic device of claim 3, wherein the knowledge base comprises a plurality of nodes comprising types of the plurality of objects and an edge comprising direction relationship information about a direction relationship among the plurality of nodes,
wherein the processor is further configured to:
identify a first node comprising a type of the first object among the plurality of objects in the knowledge base, and
identify whether a second node connected to the identified first node exists based on the direction relationship information.

5. The electronic device of claim 4, wherein the processor is further configured to:
based on identifying that the second node connected to the first node exists in the knowledge base, obtain the second image by activating the second camera, and
identify whether the second object exists in the second image based on the direction relationship information included in an edge connected between the first node and the second node.

6. The electronic device of claim 5, wherein the processor is further configured to:
based on identifying that the second object exists on the second image, estimate a moving direction of the second object, and
determine a second ROI in the second image based on the estimated moving direction of the second object.

7. The electronic device of claim 6, wherein the processor is further configured to:
identify whether the second object is present in the determined second ROI, and
determine a point of time when the second object is present in the second ROI as the time to perform the high-speed capture using the first camera.

8. The electronic device of claim 3, wherein the processor is further configured to:
based on identifying that the first object is a moving object using the first information corresponding to the first object, estimate a moving direction of the first object,
determine a third ROI in the first image based on the estimated moving direction of the first object, and
determine a point of time when the first object appears on the third ROI as the time to perform high-speed capture using the first camera.

9. The electronic device of claim 3, wherein the processor is further configured to:
determine information on a first region of interest (ROI) in the first image,
based on identifying that information on a type of the second object associated with a type of the first object does not exist in the knowledge base, monitor a state change of the first object in the first ROI, and
determine a point of time that the state of the first object changes as the time to perform high-speed capture using the first camera.

10. The electronic device of claim 2, wherein the processor is further configured to:
based on identifying that the first object is not included in the first ROI based on the information on the first ROI, obtain the second image by activating the second camera,
identify a third object on a region in the second image, the region not overlapping the first image, and
determine a point of time when the third object moves in a direction of the first image as the time to perform high-speed capture using the first camera.

11. A method of controlling an electronic device including a first camera having a first lens with a first focal distance and a second camera having a second lens with a second focal distance different from the first focal distance, the method comprising:
obtaining first information corresponding to a first object included in a first image obtained by the first camera;
identifying second information corresponding to a second object associated with the first object based on the first information corresponding to the first object,
obtaining a second image through the second camera based on identifying the second information; and determining a time to perform high-speed capture using the first camera, based on whether the second object is included in the second image.

12. The method of claim 11, wherein the obtaining first information corresponding to the first object comprises:
   determining information on a first region of interest (ROI) in the first image; and
   obtaining the first information corresponding to the first object in the first ROI by applying the information on the first ROI to a first model trained to perform object recognition.

13. The method of claim 11, wherein the obtaining the second image comprises:
   identifying whether the first object is a moving object based on the first information corresponding to the first object,
   based on identifying that the first object is a non-moving object, identifying whether information about a type of a second object associated with a type of the first object exists in a knowledge base stored in a memory, the knowledge base including information related to a plurality of objects; and
   based on identifying that the information about the type of the second object exists in the knowledge base, obtaining the second image by activating the second camera.

14. The method of claim 13, wherein the knowledge base includes a plurality of nodes including types of the plurality of objects and an edge including direction relationship information about a direction relationship among the plurality of nodes,
   wherein the determining the time to perform high-speed capture using the first camera comprises:
      identifying a first node including a type of the first object among the plurality of objects in the knowledge base, and
      identifying whether a second node connected to the identified first node exists based on the direction relationship information in the knowledge base.

15. The method of claim 14, wherein the determining the time to perform high-speed capture using the first camera further comprises:
   based on identifying that the second node connected to the first node exists in the knowledge base, obtaining the second image by activating the second camera; and
   identifying whether the second object exists in the second image based on the direction relationship information included in an edge connected between the first node and the second node.

16. An electronic device comprising:
   a memory storing one or more instructions; and
   a processor configured to execute the one or more instructions to:
      obtain first information corresponding to a first object included in a first image, the first image comprising a plurality of first frames,
      identify second information corresponding to a second object associated with the first object based on the first information corresponding to the first object,
      obtain a second image based on identifying the second information, the second image comprising a plurality of second frames, and
      determine a time to perform high-speed capture based on whether the second object is included in the second image.

17. The electronic device of claim 16, wherein the processor is further configured to:
   determine information on a first region of interest (ROI) in the first image, and
   obtain the information corresponding to the first object in the first ROI by applying the information on the first ROI to a first model trained to perform object recognition.

18. The electronic device of claim 16, wherein the memory further stores knowledge base comprising information related to a plurality of objects,
   wherein the processor is further configured to:
      identify whether the first object is a moving object based on the first information corresponding to the first object,
      based on identifying that the first object is a non-moving object, identify whether information about a type of a second object associated with a type of the first object exists in the knowledge base, and
      based on identifying that the information about the type of the second object exists in the knowledge base, obtain the second image.

19. The electronic device of claim 18, wherein the knowledge base comprises a plurality of nodes comprising types of the plurality of objects and an edge comprising direction relationship information about a direction relationship among the plurality of nodes,
   wherein the processor is further configured to:
      identify a first node comprising a type of the first object among the plurality of objects in the knowledge base, and
      identify whether a second node connected to the identified first node exists based on the direction relationship information.

20. A non-transitory computer readable recording medium storing a program for executing an operating method, the operation method including:
   obtaining first information corresponding to a first object included in a first image, the first image comprising a plurality of first frames,
   identifying second information corresponding to a second object associated with the first object based on the first information corresponding to the first object,
   obtaining a second image based on identifying the second information, the second image comprising a plurality of second frames, and
   determining a time to perform high-speed capture based on whether the second object is included in the second image.

* * * * *